US011360373B2

(12) United States Patent
Kawase

(10) Patent No.: US 11,360,373 B2
(45) Date of Patent: Jun. 14, 2022

(54) DISPLAY DEVICE

(71) Applicant: Sharp NEC Display Solutions, Ltd., Tokyo (JP)

(72) Inventor: Ryosuke Kawase, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/058,401

(22) PCT Filed: May 28, 2018

(86) PCT No.: PCT/JP2018/020371
§ 371 (c)(1),
(2) Date: Nov. 24, 2020

(87) PCT Pub. No.: WO2019/229809
PCT Pub. Date: Dec. 5, 2019

(65) Prior Publication Data
US 2021/0200073 A1   Jul. 1, 2021

(51) Int. Cl.
*G03B 21/20* (2006.01)
*G02F 1/1335* (2006.01)
(Continued)

(52) U.S. Cl.
CPC ..... *G03B 21/204* (2013.01); *G02F 1/133514* (2013.01); *G03B 21/145* (2013.01); *G03B 21/16* (2013.01)

(58) Field of Classification Search
CPC .... G03B 21/204; G03B 21/16; G03B 21/145; G02F 1/133514
(Continued)

(56) References Cited

U.S. PATENT DOCUMENTS

2016/0022374 A1    1/2016  Haider et al.
2019/0094676 A1*   3/2019  Jobi ..................... G03B 21/145

FOREIGN PATENT DOCUMENTS

CN    1577053 A    2/2005
CN    1577056 A    2/2005
(Continued)

OTHER PUBLICATIONS

Chinese Office Action, dated Jul. 16, 2021, in Chinese Application No. 201880093944.4 and English Translation thereof.
(Continued)

*Primary Examiner* — Jerry L Brooks
(74) *Attorney, Agent, or Firm* — McGinn IP Law Group, PLLC

(57) ABSTRACT

Illumination optical system (101) for outputting light to a projection lens, light source unit (102) for outputting light to illumination optical system (101), and dust-proof case (103) houses illumination optical system (101) and can be divided into two housings are provided, and the dust-proof case (103) has second positioning member (105-1), (105-2) provided on the outer surface of dust-proof case (103) and fitted to and first positioning member (104-1), (104-2) provided in light source unit (102), mounting seating surface (106) provided on the outer surface of the dust-proof case (103) for screwing light source unit (102), and pinching portion (107) for sandwiching a final optical member of light source unit (102) sandwiched between two housings.

12 Claims, 8 Drawing Sheets

(51) Int. Cl.
*G03B 21/14* (2006.01)
*G03B 21/16* (2006.01)

(58) Field of Classification Search
USPC .......................................................... 353/31
See application file for complete search history.

(56) References Cited

FOREIGN PATENT DOCUMENTS

| | | |
|---|---|---|
| CN | 101551583 A | 10/2009 |
| CN | 103782095 A | 5/2014 |
| CN | 103959162 A | 7/2014 |
| CN | 205485240 U | 8/2016 |
| JP | 3467697 B2 | 11/2003 |
| JP | 2006-309096 A | 11/2006 |
| JP | 2008-225406 A | 9/2008 |
| JP | 2015-026066 A | 2/2015 |
| JP | 2017-125891 A | 7/2017 |
| JP | 2017-130537 A | 7/2017 |
| WO | WO 2014/171151 A1 | 10/2014 |

OTHER PUBLICATIONS

International Search Report (ISR) (PCT Form PCT/ISA/210), in PCT/JP2018/020371, dated Jul. 31, 2018.

* cited by examiner

DISPLAY DEVICE

TECHNICAL FIELD

The present invention relates to a display device.

BACKGROUND ART

Main modules constituting a projection type display device for projecting an image include light sources such as lamps, lasers, and LEDs (Light Emitting Diode), optical engine, projection lenses, electronic substrates, and power supplies. Optical electronic components for generating images using an optical modulator such as DMD (Digital Mirror Device) or a liquid crystal panel is mounted on the optical engine. An electronic substrate generates and drives a drive signal in response to an external video signal. Strong light is sent from the light source of the lamp or laser/LED to the optical engine and irradiates the light modulator through each optical component. The incident light is enlarged by the projection lens and projected onto the screen.

In these processes, the electronic component generates heat due to electrical resistance, the optical component temperature rise due to the absorption of light is generated. Each component must be operated so as not to exceed the allowable temperature to achieve the desired performance Therefore, a plurality of cooling fans are mounted in the device, the blower from the cooling fan cools each component, to prevent a temperature increase so as not to exceed the allowable temperature. Further, since the life time of the liquid crystal panel is determined according to the temperature, it is necessary to further reduce the temperature.

For example, a pair of fans are respectively arranged on both sides of the projection lens, an apparatus for performing cooling is considered (e.g., see Patent Document 1.).

In the cooling of the display device, it is necessary to prevent the dust from entering the device from the outside together with the cooling air and adhering to the optical components, etc. to cause luminance deterioration. Therefore, generally the optical component is surrounded by a box, the mating portion of the parts is sealed with a packing such as a soft metal such as cushion or rubber or copper, and has a structure to prevent the inflow of dust. Strong light is sent into the enclosed box.

PRIOR ART DOCUMENTS

[Patent Document]
[Patent Document 1] U.S. Pat. No. 3,467,697

SUMMARY OF THE INVENTION

Problem to be Solved by the Invention

In the sealed structure as described above, when attempting to cool the illumination optical system, the number of parts such as parts and sealing parts covering the optical component is increased, there is a problem in which assimilability also deteriorates.

An object of the present invention is to provide a display device to solve the problems described above.

A Means for Solving the Problem

The display device of the present invention,
a display device, comprising:
an illumination optical system that outputs light to the projection lens,
a light source unit that outputs light to the illumination optical system, and
a dustproof case that houses the illumination optical system and can be divided into two housings, wherein
the dust-proof case, comprises:
a second positioning member that fits with a first positioning member provided in the light source unit provided on the outer surface of the dust-proof case,
a mounting seat surface that screws the light source unit provided on the outer surface of the dust-proof case, and
a pinching portion that sandwiches a final optical member that is a member provided in the final stage for outputting light to the illumination optical system of the light source unit between the two housings.

Effect of the Invention

As described above, in the present invention, the display device can be easily sealed without increasing the number of parts.

EXEMPLARY EMBODIMENT

It will be described below with reference to the accompanying drawings embodiments of the present invention.

First Embodiment

Figure 1:
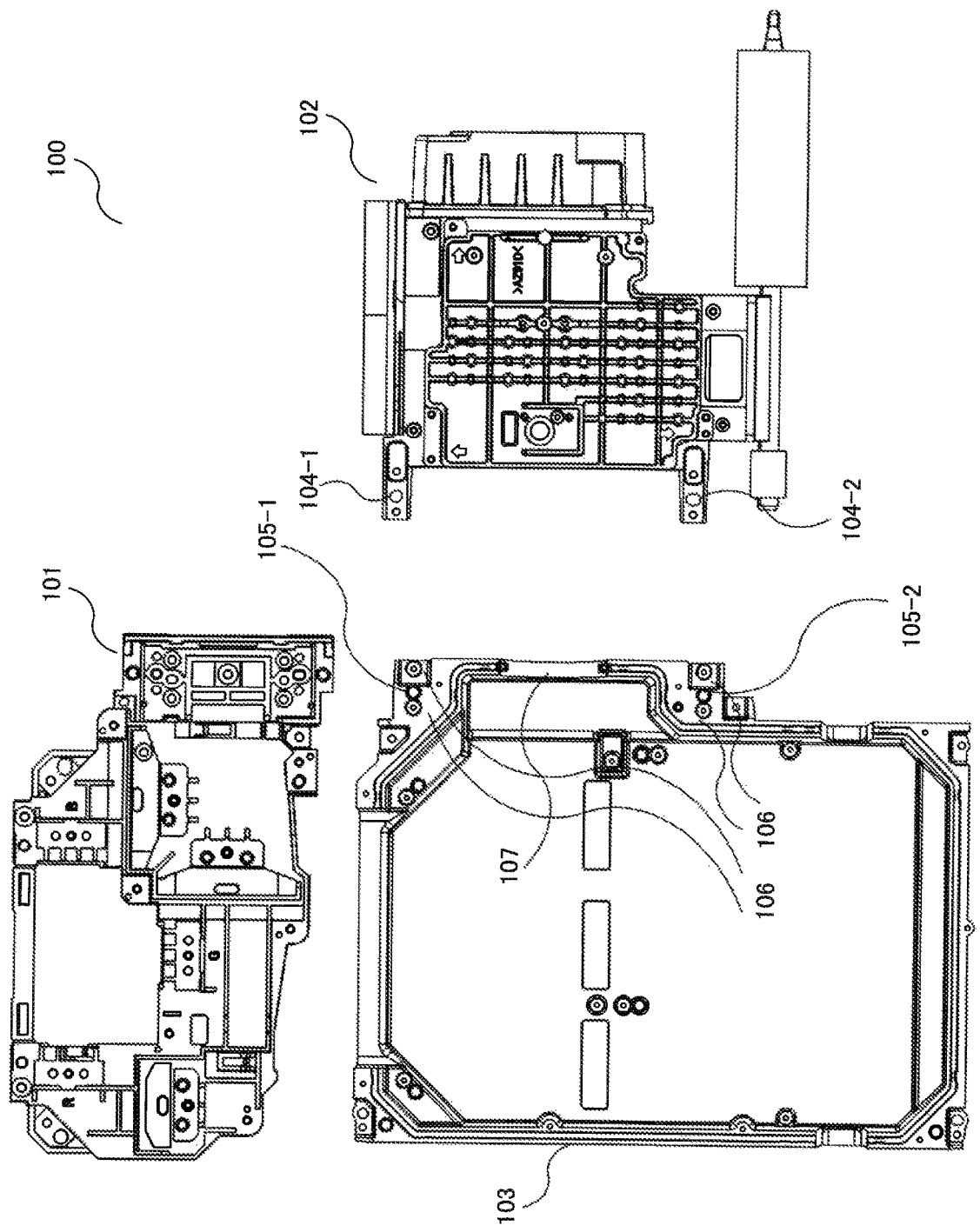
FIG. 1 is a diagram illustrating a first embodiment of the display device of the present invention.

FIG. 1 is a diagram illustrating a first embodiment of the display device of the present invention. Display device 100 in this embodiment, as shown in FIG. 1, illumination optical system 101, dust-proof case 103, and light source unit 102. Illumination optical system 101 outputs light to the projection lens. Light source unit 102 outputs light to illumination optical system 101. Dust-proof case 103 houses illumination optical system 101. Dust-proof case 103 can be divided into two housings. Dust-proof case 103 has second positioning member 105-1,105-2, provided on the outer surface of dust-proof case 103, fitted to first positioning member 104-1,104-2 provided in light source unit 102 respectively. Dust-proof case 103 has mounting seat surface 106, provided on the outer surface of dust-proof case 103, for screwing light source unit 102. Dust-proof case 103 has pinching portion 107 for sandwiching a final optical member of light source unit 102 between the two housings. The final optical member is a member provided in the final stage for outputting light to illumination optical system 101.

Figure 2:
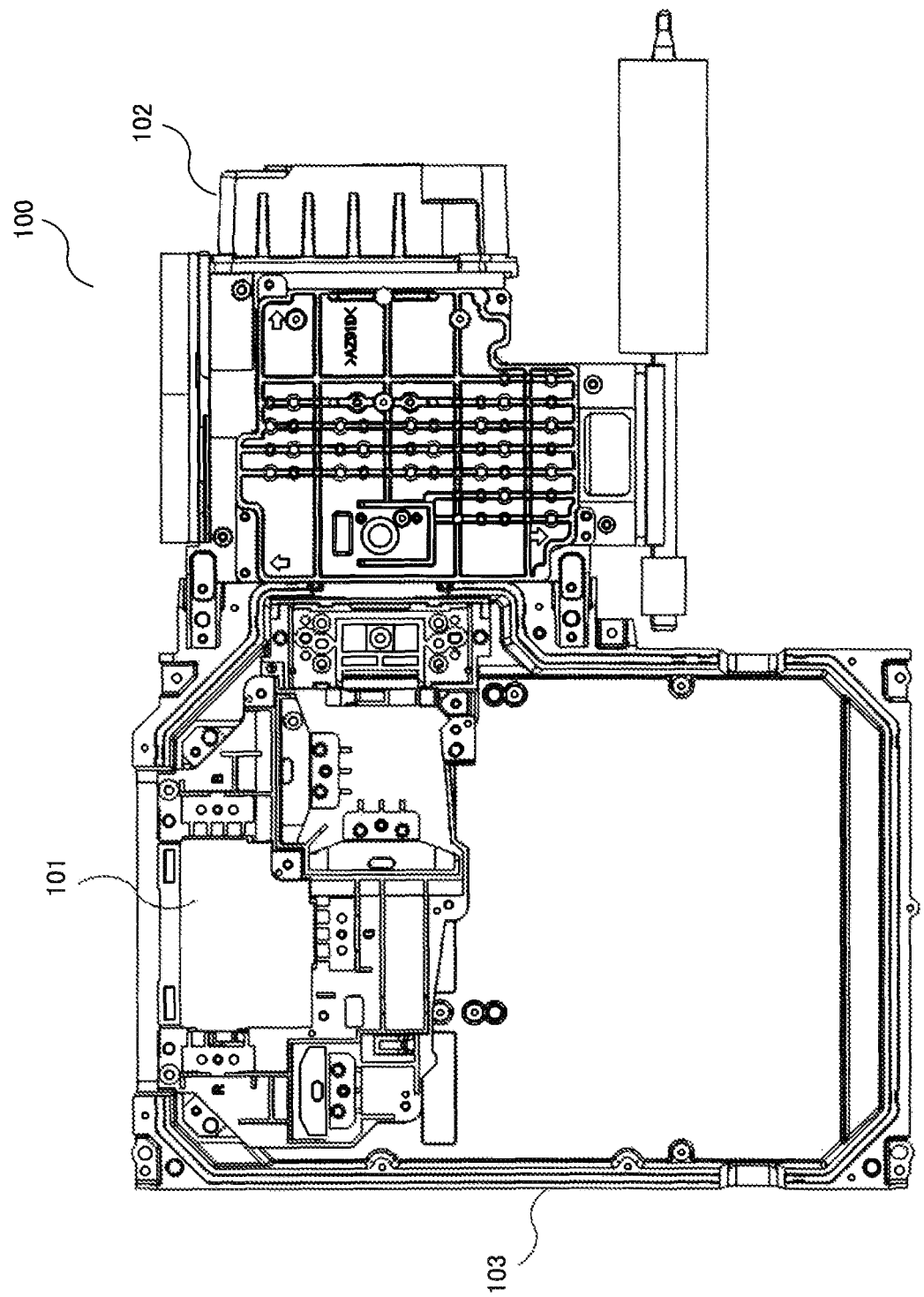
FIG. 2 is a plan view illustrating an example of a display device when the illumination optical system shown in FIG. 1 is housed in the dust-proof case.

FIG. 2 is a plan view illustrating an example of display device 100 when illumination optical system 101 shown in FIG. 1 is housed in dust-proof case 103. As shown in FIG. 2, illumination optical system 101 is housed in dust-proof case 103, light source unit 102 is combined with dust-proof case 103.

Thus, dust-proof case 103 for housing illumination optical system 101 comprises a positioning member for fitting with light source unit 102 and a seating surface for screwing light source unit 102, the final optical member of light source unit 102 is sandwiched by the two housing that constitutes dust-proof case 103. Thus, it is possible to easily seal illumination optical system 101 without increasing the number of parts.

Second Embodiment

Figure 3:
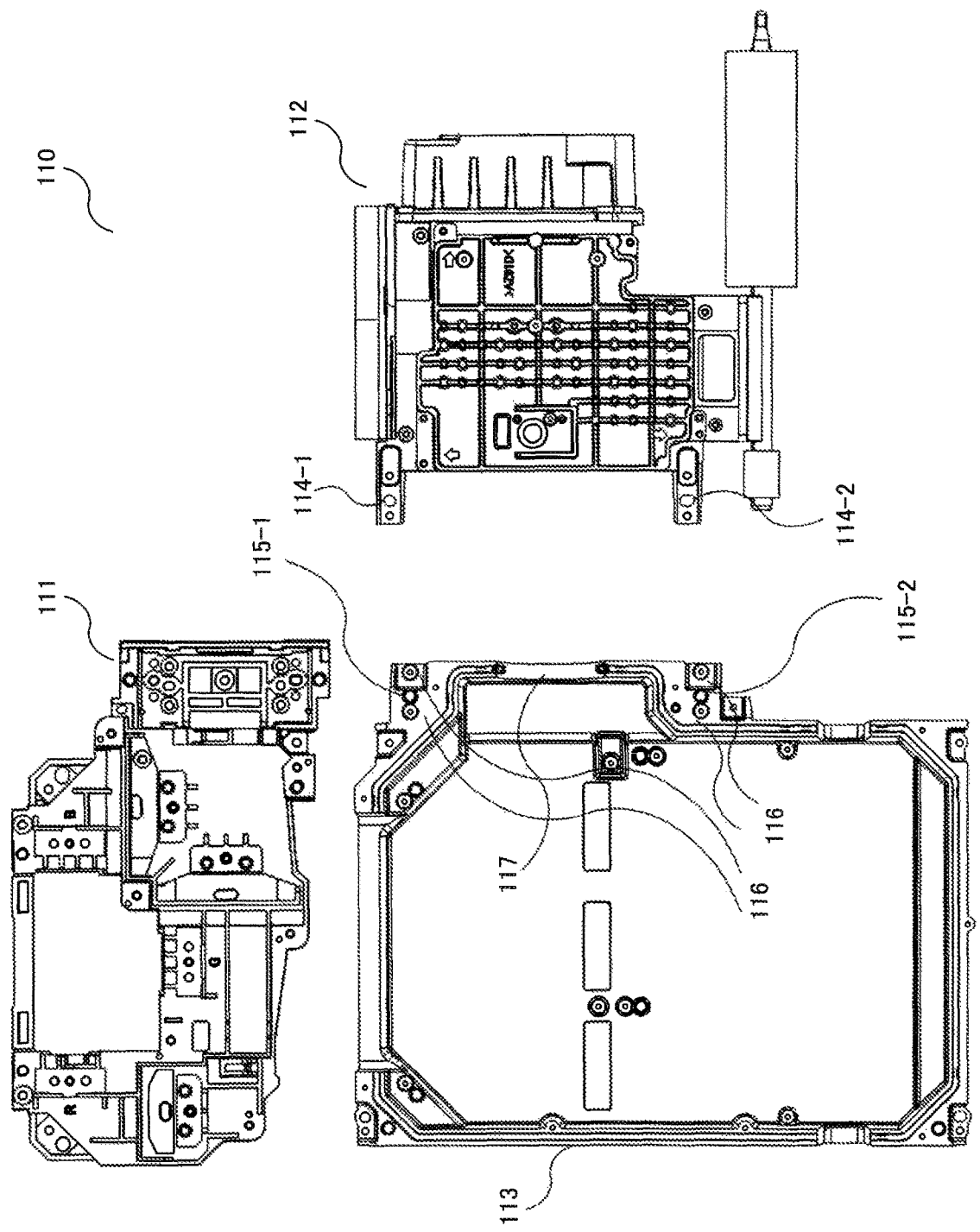
FIG. 3 is a diagram illustrating a second embodiment of the display device of the present invention.

FIG. 3 is a diagram illustrating a second embodiment of the display device of the present invention. Display device 110 in this embodiment, as shown in FIG. 3, has illumination optical system 111, dust-proof case 113 and light source unit 112. Illumination optical system 111 outputs light to the projection lens. Light source unit 112 outputs light to illumination optical system 111. Light source unit 112 is an assembly component that combines the optical components such as LD (Laser Diode), LEDs, lamps, PW (phosphor wheels), diffuser plate, a single lens and the structural components and cooling components. Dust-proof case 113 houses the illumination optical system 111. Dust-proof case 113 can be divided into two housings. Dust-proof case 113 has a second positioning member 115-1,115-2, provided on the outer surface of dust-proof case 113, fitted to first positioning member 114-1,114-2 provided in light source unit 112 respectively. Dust-proof case 113 has mounting seat surface 116, provided on the outer surface of dust-proof case 113, for screwing light source unit 112. Dust-proof case 113 has pinching portion 117 for sandwiching a final optical member of light source unit 112 between the two housings. Further, dust-proof case 113 can be divided into two housings on a straight line perpendicular to the optical axis passing through the center of the lens of the final optical member of light source unit 112. Further, as regards first positioning member 114-1,114-2 and second positioning member 115-1,115-2, one shape is pin-shaped, the other shape is a hole-shaped fitting to the shape of the pin. Further, the first positioning member 114-1,114-2 and the second positioning member 115-1,115-2 shown in FIG. 3 is two, respectively, but not limited to that number, may be respectively three or more. The number of mounting seat surface 116 shown in FIG. 3 is four, but is not limited to that number. Further, pinching portion 117 of dust-proof case 113 combines the two housings with each other using a cushioning material. Further, a packing is provided at portions other than pinching portion 117 of dust-proof case 113, the two housings are combined with each other. Further, dust-proof case 113 is made of aluminum die-casting or magnesium die-casting.

Figure 4:
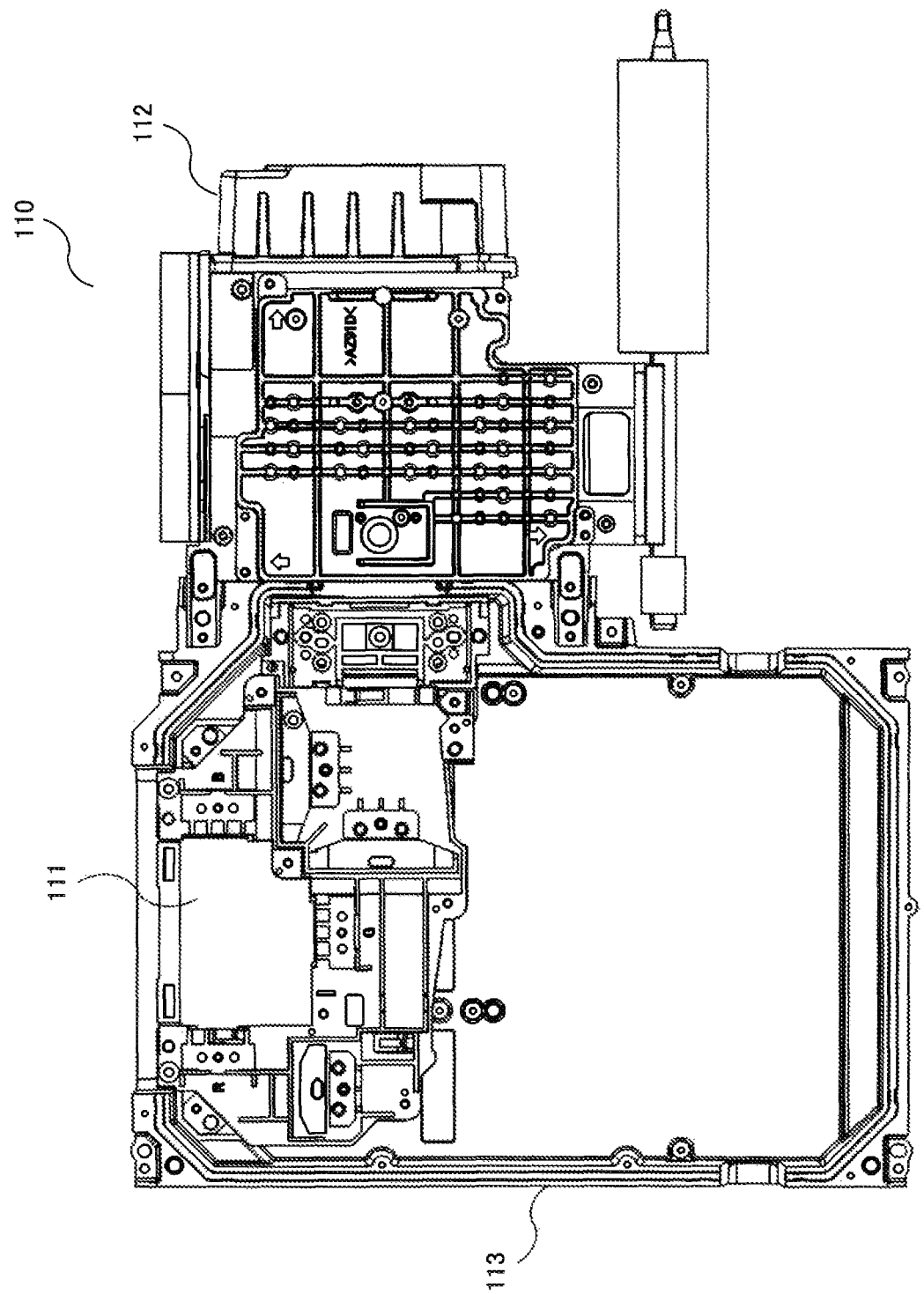
FIG. 4 is a plan view illustrating an example of a display device when the illumination optical system shown in FIG. 3 is housed in the dust-proof case.

FIG. 4 is a plan view illustrating an example of display device 110 when illumination optical system 101 shown in FIG. 3 is housed in dust-proof case 113. As shown in FIG. 4, illumination optical system 111 is housed in dust-proof case 113, light source unit 112 is combined with dust-proof case 113. Further, illumination optical system 111, in a state where first positioning member 114-1,114-2 of light source unit 112 and second positioning member 115-1,115-2 of dust-proof case 113 is fitted respectively, illumination optical system 111 is housed so that the optical axis of the light output from light source unit 112 is a position for inputting light to illumination optical system 111. At this time, after illumination optical system 111 is housed in one housing of dust-proof case 113 in a state where the two housings of dust-proof case 113 are not combined, the two housing is combined. Further, first positioning member 114-1,114-2 and second positioning member 115-1,115-2 of dust-proof case 113 in a state where the two casings of dust-proof case 113 are not combined is fitted, by being screwed in mounting seat surface 116, light source unit 112 is attached to dust-proof case 113.

Figure 5:
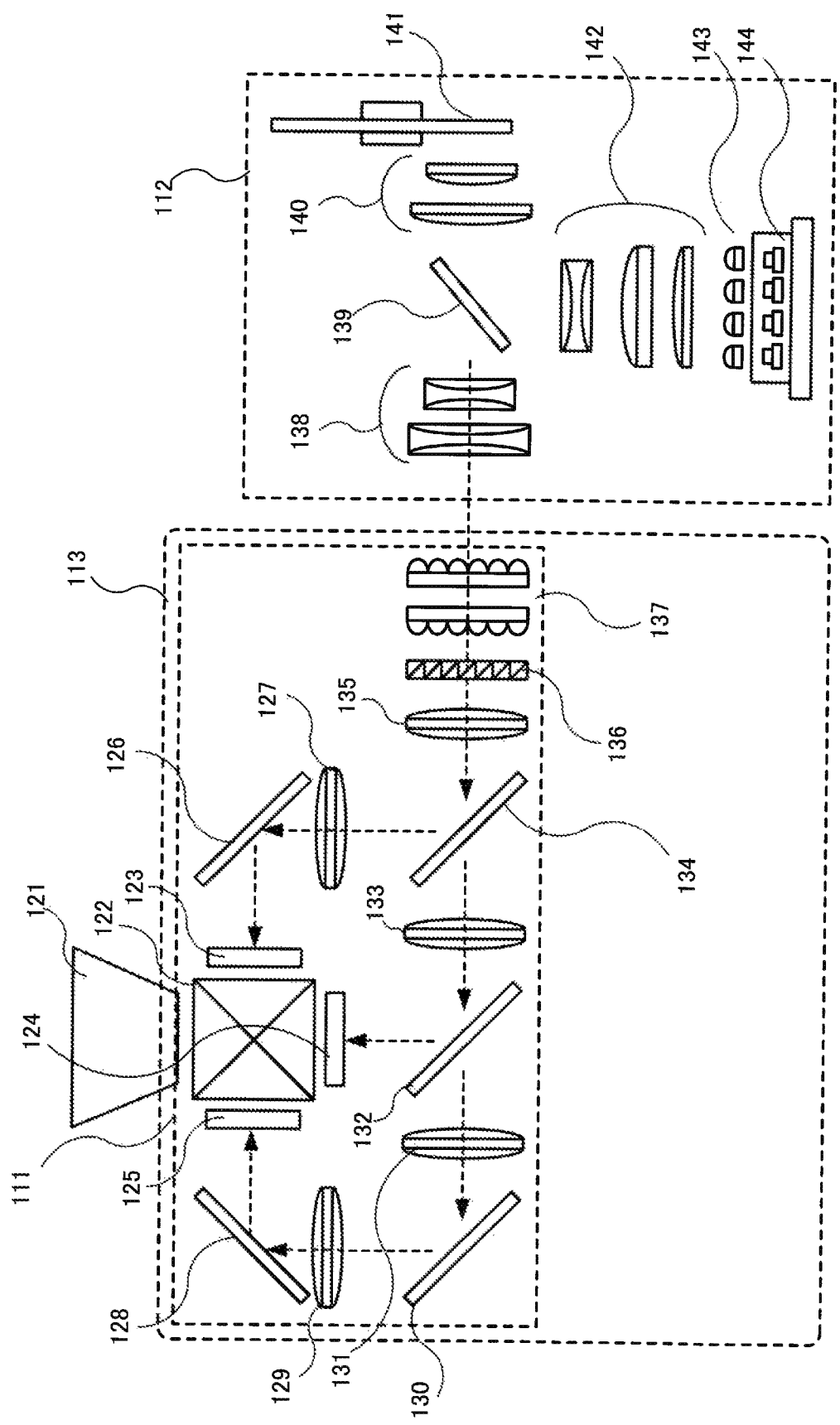
FIG. 5 is a diagram illustrating an example of the internal configuration of the illumination optical system and the light source unit shown in FIG. 3.

FIG. 5 is a diagram showing an example of the internal configuration of the illumination optical system 111 and the light source unit 112 shown in FIG. 3. Illumination optics 111 shown in FIG. 3, as shown in FIG. 5 has a XDP 122 which is a cross dichroic prism, three liquid crystal panels 123-125, mirror 126, field lens 127, mirror 128, relay lens 129, mirror 130, relay lens 131, color filter 132, field lens 133, color filter 134, field lens 135, PBS (Polarizing Beam Splitter) 136 which is a polarizing beam splitter, and integrator 137 for adjusting the uniformity of illuminance, and outputs light to the projection lens 121. Light source unit 112 shown in FIG. 3, as shown in FIG. 5, includes lens 138, DM 139, lens 140, phosphor 141, lens 142, lens 143, and laser 144. Each component of illumination optical system 111 and light source unit 112 may be identical to that of a typical projector.

Light from laser 144 is output using other components constituting light source unit 113. Also, in this embodiment, of the light that passed through integrator 137, PBS 136 and field lens 135, blue light is reflected by color filter 134, passes through field lens 127 and is reflected by mirror 126. Also, of the light that has passed through integrator 137, PBS 136 and field lens 135, green light passes through color filter 134 and field lens 133 and is reflected color filter 132. Also, of the light that has passed through integrator 137, PBS 136 and field lens 135, red light passes through color filter 134, field lens 133, color filter 132 and relay lens 131, is reflected by mirror 130, passes through relay lens 129 and is reflected by mirror 128. Therefore, liquid crystal panel 123 modulates the blue light. Further, liquid crystal panel 124 modulates the green light. Further, liquid crystal panel 125 modulates the red light. Thus, the light output from light source unit 112 is divided into three primary color lights (blue, green and red light) using color filter 134,132, each of the divided three light fluxes is irradiated to the three liquid crystal panels 123 to 125.

Although not shown in FIG. 5, a fan (blower) may be provided for cooling liquid crystal panels 123 to 125 outside or inside illumination optical system 111 in dust-proof case 113. The fan may be three fans that cool each of liquid crystal panels 123 to 125. Taking into account the cooling effect of liquid crystal panels 123 to 125, the three fans may be blower fans arranged side by side along a direction in which liquid crystal panel 123 and the liquid crystal panel 125 face each other on the side opposite to projection lens 121 side of liquid crystal panels 123 to 125.

Figure 6:
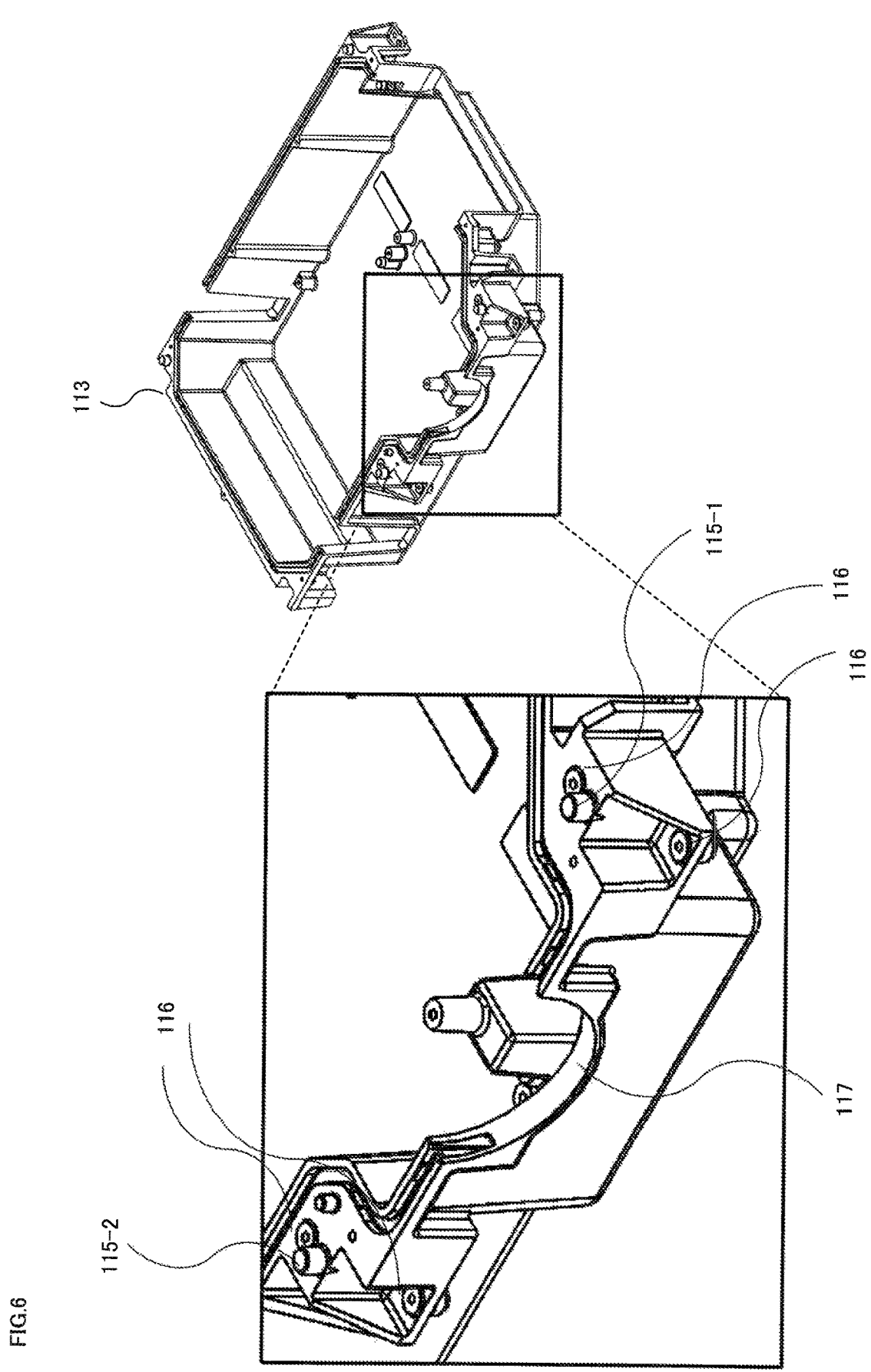
FIG. 6 is a diagram illustrating an enlarged view of second positioning member the mounting seat surface and the pinching portion provided in the dust-proof case shown in FIG. 3.

FIG. 6 is a diagram illustrating an enlarged view of second positioning member 115-1,115-2, mounting seat surface 116 and pinching portion 117 provided in dust-proof case 113 shown in FIG. 3. As regards, second positioning member 115-1,115-2, mounting seat surface 116 of the four locations and pinching portion 117 provided in dust-proof case 113 shown in FIG. 3, as shown in FIG. 6, second positioning member 115-1 for fitting with first positioning member 114-1 of light source unit 112 shown in FIG. 3 are provided. Further, second positioning member 115-2 for fitting with first positioning member 114-2 of light source unit 112 shown in FIG. 3 is provided. Here, since the shape of second positioning member 115-1,115-2 is a pin-shaped, in this case, the shape of first positioning member 114-1,114-2 provided in light source unit 112 is a hole-shaped. Further, when the shape of second positioning member 115-1,115-2 is a hole-shaped, the shape of first positioning member 114-1,114-2 provided in light source unit 112 is a pin-shaped. Or, the shape of first positioning member 114-1, 114-2 and second positioning member 115-1,115-2 is not limited to a pin-shaped or hole-shaped, first positioning member 114-1,114-2 and second positioning member 115-1,115-2 are fitted respectively and light source unit 112 and dust-proof case 113 may be those to be fixed. Further, on mounting seat surface 116, a screw hole for screwing light source unit 112 to dust-proof case 113 is provided. Further, pinching portion 117 has a shape corresponding to the shape of the final optical member (the lens portion closest to the illumination optical system of light source unit 112) of light source unit 112, and has a shape that achieves a dust-proof effect when sandwiching the final optical member.

Figure 7:
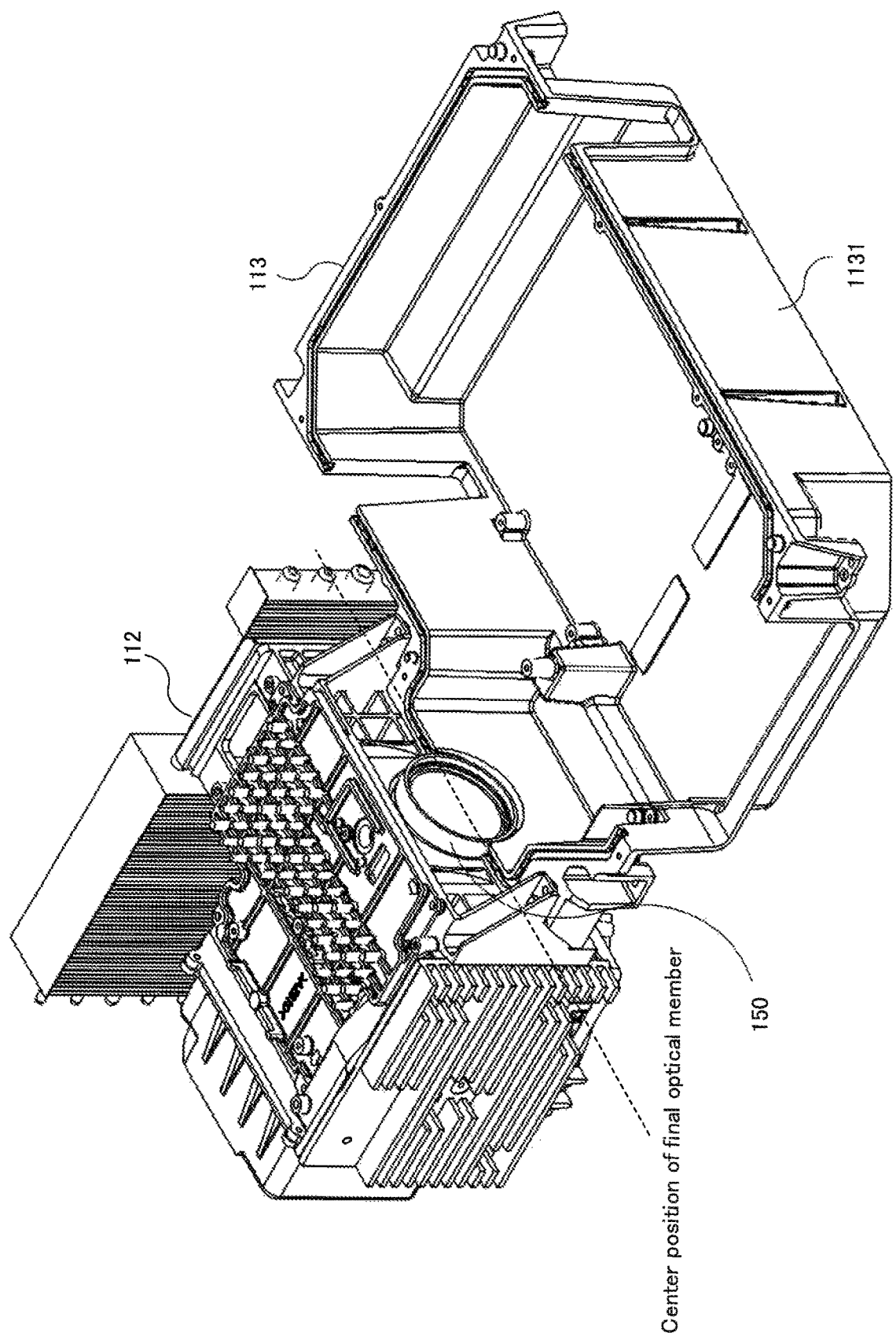
FIG. 7 is a diagram illustrating an external view of a case of attaching the light source unit shown in FIG. 3 to the housing of the lower side of the dust-proof case.

FIG. 7 is a diagram illustrating an external view of a case of attaching light source unit 112 shown in FIG. 3 to the housing of the lower side of dust-proof case 113. As shown in FIG. 7, light source unit 112 that is attached to base housing 1131 is one housing of dust-proof case 113 which can be divided into two housings. At this time, a structure that a straight line perpendicular to the optical axis passing through the center (serving as the optical axis) of the lens of final optical member 150 of light source unit 112 and the edge of base housing 1131 of dust-proof case 113 matches is provided. Final optical member 150 is a member provided in the final stage for outputting light to illumination optical system 111 and a portion (lens, glass) for exposing light to integrator 137 of illumination optical system 111.

Figure 8:
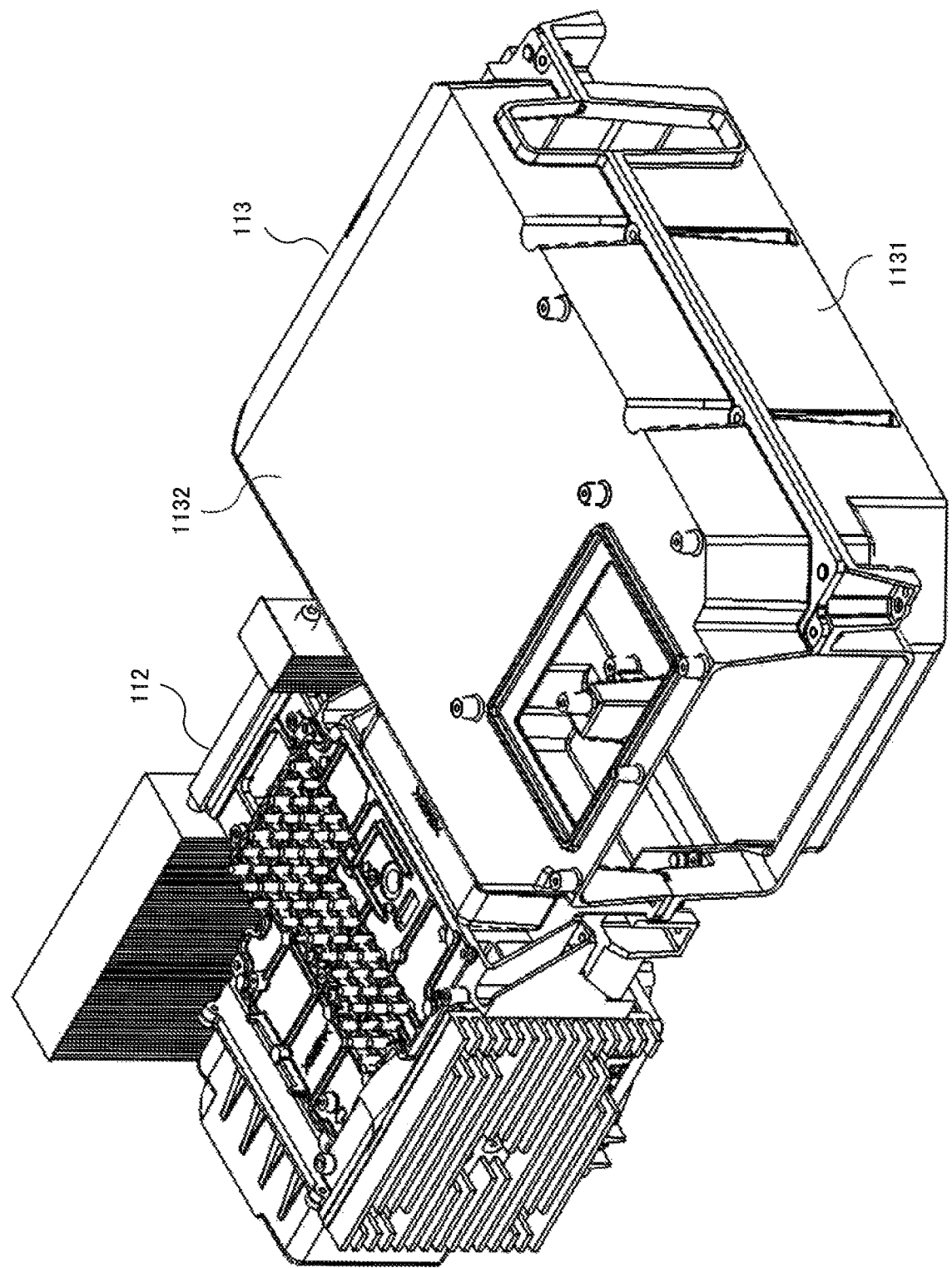
FIG. 8 is a diagram illustrating an external view of a case of attaching the light source unit shown in FIG. 3 to the dust-proof case.

FIG. 8 is a diagram illustrating an external view of a case of attaching light source unit 112 shown in FIG. 3 to dust-proof case 113. As shown in FIG. 8, light source unit 112 shown in FIG. 7 is disposed outside dust-proof case 113, final optical member 150 of light source unit 112 is sandwiched between base housing 1131 and cover housing 1132 of dust-proof case 113. Here, as shown in FIG. 7, since the structure in which a straight line perpendicular to the optical axis of final optical member 150 and the edges of base housing 1131 match, the two housings of dust-proof case 113 are combined at the optical axis of the final lens, a projection type display device characterized by a configuration sandwiching a part of light source unit 112 by the two housing of dust-proof case 113 is provided. In FIG. 8, although illumination optical system 111 in dust-proof case 113 is not housed, actually illumination optical system 111 is housed in dust-proof case 113. Base housing 1131 and cover housing 1132 is box-shaped, made of aluminum die-casting or magnesium die-casting.

Thus, in the present invention, the light source unit and the illumination optical system is attached to the dust-proof case, the assemblability of the light source unit and the illumination optical system is increased. In addition, by using a dustproof case that can be divided into two housings at the optical axis of the lens that is the final optical member of the light source unit, the sealing structure is simplified and the air tightness is increased. Illumination optical system is affected by optical performance, depending on the mounting structure and fastening members. In the present invention, the material is a box-shaped aluminum die-casting or magnesium die-casting, it is possible to increase the strength of the lower side (base housing) of the dust-proof case. This maintains optical performance and allows mounting of the light source unit.

In the present invention as described above, both the illumination optical system and the light source unit are attached to the dust-proof case. Thus, by removing the upper housing (cover housing 1132 shown in FIG. 8) of the dust-proof case, the procedure of removing the illumination optical system and the light source unit is eliminated, the productivity is improved. Further, the alignment of the illumination optical system and the light source unit is performed using a seating surface and the positioning member provided in the dust-proof case. At this time, the dust-proof case is made of die-casting, for performing respective machining of the position where the light source unit and the position where the illumination optical system is attached in the dust-proof case is attached, it has a sufficient accuracy to exhibit optical performance. In general, the illumination optical system is deformed by an external force to such as a housing, the optical performance of the optical axis may be degraded in optical performance due to deviation occurs. In the present invention, by increasing the intensity of the lower housing (base housing 1131 shown in FIGS. 7 and 8) of the dust-proof case the illumination optical system and the light source unit are attached to the dust-proof case, since the structure the external force is not directly applied to the illumination optical system is provided, the optical performance can be maintained. Further, a configuration that does not place the entire light source unit in the dust-proof case is provided, by sandwiching a part of the light source unit between the two housings of the upper housing and the lower housing of the dust-proof case, the final optical member alignment of the light source lens and the dust-proof case is facilitated. Furthermore, the accuracy of the alignment of the final lens is a final optical member of the light source unit and the dust-proof case is high, it is possible to manage the compression amount of the sealing member such as a cushion used by compressing pinching portion 117 shown in FIG. 6, dust-proof performance is improved.

Further, in the present invention, when the upper housing (cover housing 1132 shown in FIG. 8) and the lower housing (base housing 1131 shown in FIGS. 7 and 8) of the dust-proof case, are intended to sandwich the cylindrical one such as the final lens that is the final optical member of the light source unit, since the two housings are divided by a straight line perpendicular to the center of the cylinder, it is possible to equally compress the cushion when sandwiched. Further, since the dust-proof case is that intended to be divided by a straight line perpendicular to the optical axis of the light source lens is a final optical member in two casing, the upper and lower of the dust-proof case can be divided in a plane, easily sealed step is reduced. Further, the upper housing (cover housing 1132 shown in FIG. 8) and the lower housing (base housing 1131 shown in FIGS. 7 and 8) of the dust-proof case can be sealed easily because the matching becomes a plane. Furthermore, it is possible to reduce the sealing member by placing up to the integrator of the imaging unit (not including the projection lens) and the illumination unit in the dust-proof case.

The invention claimed is:

1. A display device, comprising:
    an illumination optical system that outputs light to a projection lens,
    a light source unit that outputs light to the illumination optical system, and
    a dustproof case that houses the illumination optical system and can be divided into two housings, wherein the dust-proof case, comprises:
    a second positioning member that fits with a first positioning member provided in the light source unit provided on an outer surface of the dust-proof case,
    a mounting seat surface that screws the light source unit provided on the outer surface of the dust-proof case, and
        a pinching portion that sandwiches a final optical member that comprises a member provided in a final stage for outputting light to the illumination optical system of the light source unit between the two housings.

2. The display device according to claim 1, wherein the dust-proof case can be divided into the two housings on a straight line perpendicular to an optical axis passing through a lens of the final optical member.

3. The display device according to claim 1, wherein one shape of the first positioning member and the second positioning member shape is a pin-shaped, and the other shape is a hole-shaped that fits the shape of the pin display device.

4. The display device according to claim 1, wherein the two housings of the dust-proof case are combined with each other, using a cushion material at the pinching portion, and using a packing at other portions.

5. The display device according to claim 1, wherein the dust-proof case comprises aluminum die-casting or magnesium die-casting.

6. The display device according to claim 1, wherein the illumination optical system is housed, so that an optical axis of the light output from the final optical member is a position for inputting light for the illumination optical system in a state where the first positioning member and the second positioning member are fitted.

7. The display device according to claim 1, wherein, in a state where the two housings of the dust-proof case are not combined, the illumination optical system is housed in one housing of the dust-proof case, and then the two housings are combined.

8. The display device according to claim 1, wherein, in a state where the two housings of the dust-proof case are not combined, the first positioning member and the second positioning member are fitted, by being screwed in the mounting seat surface, and then the light source unit is attached to the dust-proof case.

9. The display device according to claim 1, wherein the illumination optical system, comprises:
    a color filter that divides the light output from the light source unit into three primary color lights, and
    three liquid crystal panels in which the divided three light fluxes are irradiated respectively.

10. The display device according to claim 1, wherein the light source unit, comprises:
    a laser light source,
    a phosphor, and
    a plurality of lenses, wherein
    the display device outputs the light emitted from the laser light source, using the phosphor and the plurality of lenses, to the illumination optical system,
    the final optical member comprises a lens disposed in the final stage of the output to the illumination optical system among the plurality of lenses.

11. A method of assembling the display device according to claim 1, wherein, in a state where the two housings of the dust-proof case are not combined, the illumination optical system is housed in one housing of the dust-proof case, and then the two housings are combined.

12. A method of assembling the display device according to claim 1, wherein, in a state where the two housings of the dust-proof case are not combined, the first positioning member and the second positioning member are fitted, by being screwed in the mounting seat surface, and then the light source unit is attached to the dust-proof case.

* * * * *